I. W. MERRILL.
Steam-Trap.

No. 212,391.  Patented Feb. 18, 1879.

Witnesses:
Geo. W. Pierce
Ed. W. Pierce

Inventor:
Isaac W. Merrill
by Wright & Brown
Attys.

UNITED STATES PATENT OFFICE.

ISAAC W. MERRILL, OF NORWAY, MAINE.

IMPROVEMENT IN STEAM-TRAPS.

Specification forming part of Letters Patent No. 212,391, dated February 18, 1879; application filed April 29, 1878.

*To all whom it may concern:*

Be it known that I, ISAAC W. MERRILL, of Norway, in the county of Oxford and State of Maine, have invented certain Improvements in Steam-Traps, of which the following is a specification:

This invention relates to that class of steam-traps for returning water of condensation from coils or radiators into the boiler in which the trap is suspended from the short arm of a pivoted weighted lever and is free to rise and fall.

In this class of traps the suspended trap is counterbalanced and held in an elevated position by the weighted lever until said trap is nearly or quite filled with water of condensation, when its weight causes it to overcome the weight of the lever and descend. The descent of the trap causes the lever to tilt on its pivot, and also opens a valve, which admits steam from the boiler onto the water in the trap, the pressure of the steam forcing the water out of the trap until the latter becomes light enough to be raised by the weighted lever, which tilts in the opposite direction. The upward movement of the trap shuts off the steam, and the trap is again allowed to fill with water.

My invention has particular reference to the lever above mentioned, when said lever and weight are so arranged that the weight shifts or slides automatically as the lever tilts, the weight being thus caused to increase the leverage or counterbalancing power of the lever when the same is holding the trap in an elevated position, and decrease the counterbalancing power when the trap is depressed, so that the lever and trap will not remain so nearly counterpoised that the trap will be raised by the lever as soon as a small part of the water therein is discharged, as is found to be the case when the weight is fixed.

The object of my invention is to enable the limit in which the weight slides or shifts on the lever to be adjusted, both as to the length of the movement of the sliding weight and the distance of either limit of its movement from the pivot or fulcrum of the lever.

To this end my invention consists in the provision of two independently adjustable stops located on the long arm of the lever, and adapted to control or limit the movements of the sliding weight, as I will now proceed to describe.

Figure 2:
Figure 1:
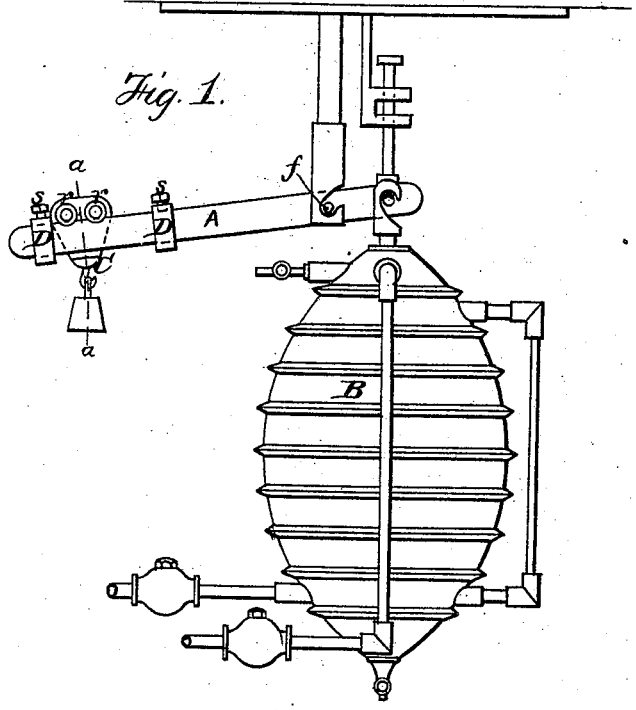
Figure 3:
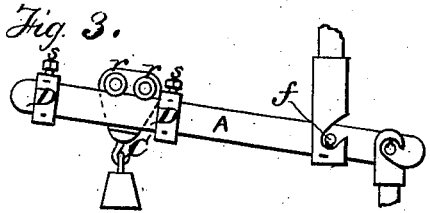
Figure 5:
Figure 4:
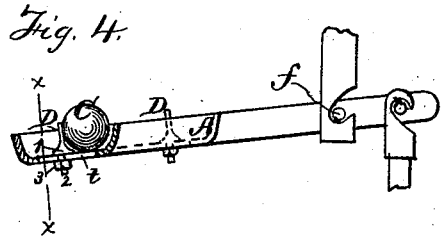

Of the drawings forming a part of this specification, Figure 1 represents a side elevation of a steam-trap embodying my improvements, the lever and weight being in position to hold the trap in an elevated position. Fig. 2 represents a section on line *a a*, Fig. 1. Fig. 3 represents a side view of the lever and weight, showing the position of said parts when the trap is depressed. Fig. 4 represents a side view and partial section of a modified form of the lever; and Fig. 5 represents a section on line *x x*, Fig. 4.

Similar letters of reference indicate corresponding parts.

In the drawings, A represents the lever, which is of the first order, and is pivoted or fulcrumed at *f*; and B represents the trap, which is suspended from the shorter arm of the lever.

The class of traps to which my invention relates is well illustrated in the United States patent to Meharg, dated April 27, 1875, No. 162,567, to which reference is made for a fuller description.

C represents the sliding weight, which is located on the longer arm of the lever, and is of any suitable construction whereby it is adapted to slide longitudinally of the lever. The weight may be provided with rollers *r r*, arranged to run on the upper edge of the lever, as shown in Figs. 1, 2, and 3; or it may be spherical, and arranged to roll in a groove or trough formed in the lever, as shown in Figs. 4 and 5. If desired, the weight may be provided with an additional suspended weight, as shown in Figs. 1, 2, and 3.

D D represent the adjustable stops. These are two in number, and are independent of each other. They are of any suitable construction which will admit of their firm attachment to the lever to form stops for the weight C, at any desired distance apart, and at any desired distance from the fulcrum of the lever. When the lever is composed of a flat bar, I prefer to make the stops D in the form of bands or frames, inclosing the lever, and provided with set-screws *s*, whereby they may be fixed at any desired points. When the lever is made trough-shaped, as shown in Figs. 4 and 5, I prefer to make the stops in the form of posts, arranged to slide in a slot, $t$, in the bottom of the lever, each post being provided with a flange or base, 1, a threaded bolt, 2, projecting through the slot $t$, and a nut, 3, working on the bolt 2, and arranged to bear against the under side of the lever and hold the stop to which it belongs in any desired position. The stops D D are preferably arranged at such a distance apart and from the fulcrum of the lever as may be required to enable the weight when at the outer limit of its movement to hold up the trap until the latter is about full of water, and when at the inner limit of its movement to be held up by the trap until the latter is about empty. The positions of the stops to produce these results will be determined in each case by the weight of the trap; and as traps of the kind represented are usually composed of large castings they cannot well be made exactly alike in weight in the process of manufacture, it being well known that castings from the same mold are liable to vary in weight. It will be seen, therefore, that the adjustable stops D enable the weighted lever to be readily adjusted to the weight of the trap.

I am aware that a steam-trap has been before suspended from the short arm of a lever, having an adjustable weight on its long arm, and I do not therefore claim broadly the combination of an adjustable weight with the lever and trap; but I am not aware that an automatically sliding or shifting weight has ever been employed in connection with adjustable stops on the lever, as shown in this application.

I claim as my invention—

In combination with the lever A, having the trap B suspended from its shorter arm, and the automatically sliding or shifting weight on its longer arm, the adjustable stops D D, whereby the movement of said weight is regulated, substantially as described.

In testimony whereof I have signed my name to this specification in the presence of two subscribing witnesses.

ISAAC W. MERRILL.

Witnesses:
   I. L. WETHERELL,
   G. S. HATHAWAY.